United States Patent
Cook, Jr. et al.

[11] Patent Number: 6,071,618
[45] Date of Patent: Jun. 6, 2000

[54] PROCESS FOR INCREASING THE SOLUBILITY RATE OF A WATER SOLUBLE FILM

[75] Inventors: Philip H. Cook, Jr., Greer; Tina V. Lorenzo Moore, Spartanburg, both of S.C.

[73] Assignee: Cryovac, Inc., Duncan, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/729,107

[22] Filed: Oct. 11, 1996

[51] Int. Cl.[7] .............................. C08F 2/46; B32B 27/16
[52] U.S. Cl. .................. 428/412; 428/423.1; 428/483; 428/475.2; 428/476.3; 428/474.4; 428/515; 428/516; 428/518; 428/520; 428/910; 156/272.2; 156/247; 156/344; 264/173.16; 264/139; 264/488; 427/496; 427/498; 427/526; 427/551; 427/540; 427/153; 522/88; 522/153; 522/154; 522/164
[58] Field of Search .............................. 428/500, 515, 428/518, 520, 36.6, 36.7, 412, 532, 474.4, 476.3, 910; 427/533, 551, 496, 498, 526, 540, 536, 153; 264/123.16, 488, 139, 166, 212; 156/272.2, 247, 344

[56] References Cited

U.S. PATENT DOCUMENTS

| | | | |
|---|---|---|---|
| 3,632,039 | 1/1972 | Gayle | 206/525 |
| 3,636,956 | 1/1972 | Schneider | 606/224 |
| 3,892,905 | 7/1975 | Albert | 428/220 |
| 3,900,378 | 8/1975 | Yen et al. | 204/159 |
| 4,064,296 | 12/1977 | Bornstein et al. | 428/35 |
| 4,311,774 | 1/1982 | Raphael | 430/14 |
| 4,606,922 | 8/1986 | Schirmer | 426/412 |
| 4,745,042 | 5/1988 | Sasago et al. | 430/156 |
| 4,781,838 | 11/1988 | Crassous et al. | 210/692 |
| 5,051,222 | 9/1991 | Marten et al. | 264/143 |
| 5,118,586 | 6/1992 | Hattori et al. | 430/20 |
| 5,316,688 | 5/1994 | Gladfelter et al. | 252/90 |
| 5,362,532 | 11/1994 | Famili et al. | 428/36 |
| 5,429,874 | 7/1995 | VanPutte | 428/522 |

FOREIGN PATENT DOCUMENTS

| | | |
|---|---|---|
| 226 983 | 8/1990 | New Zealand . |
| 227 311 | 2/1991 | New Zealand . |
| WO 95/00333 | 1/1995 | WIPO . |

OTHER PUBLICATIONS

"Effect of Radiation Crosslinking Reaction Temperature on General Equation of Sol Fraction–Dose Relationship for Polymers"; Zhang; Chinese Science Bulletin; vol. 36, No. 9, pp. 720–724, May, 1991.

"Radiation–Induced Crosslinking"; Tabata; Radiat. Phys. Chem. vol. 14, pp. 235–243. Pergamon Pre Ltd. 1979.

JP 9124804 A (Abstract), May 13, 1997.

*Primary Examiner*—Paul Thibodeau
*Assistant Examiner*—D. Lawrence Tarazano
*Attorney, Agent, or Firm*—Mark B. Quatt

[57] ABSTRACT

A polymeric film includes at least one irradiated water soluble layer. A process for making a water soluble film includes the steps of extruding a water soluble film; and irradiating the water soluble film. Using electron beam irradiation, a water soluble film's solubility rate can be increased.

15 Claims, 1 Drawing Sheet

PROCESS FOR INCREASING THE SOLUBILITY RATE OF A WATER SOLUBLE FILM

BACKGROUND OF THE INVENTION

The present invention relates to a water soluble film, and a process for increasing its solubility rate.

Caustic or potentially hazardous materials such as detergents, soaps, plant protection agents, dyes for the textile industry, concrete additives, and fertilizers are typically packaged in dispensers, such as high density polyethylene bottles, or other containers. After the chemical contents of the container have been used, the empty dispenser or container must be disposed of in an environmentally safe way. This can be technically difficult and expensive.

Another concern with the use of such caustic or otherwise potentially hazardous chemicals or other materials is the safety of the user. In installing, using, and disposing of dispensers or containers containing such materials, the safety of the user can be jeopardized if the dispensing or storage system is not properly handled.

Water soluble films are useful in many applications in addressing these problems. These applications include the packaging of detergents, fertilizers, and other products. Such films offer the advantage of containing a product inside a package made from the film until ready for use. When the product is needed, the package is immersed in water or some aqueous based medium to dissolve the contents of the package in the aqueous medium while additionally dissolving the packaging material itself. Such uses offer an environmentally attractive alternative to containers which do not dissolve, and must therefore be disposed of after use.

However, a problem encountered when using water soluble films is that in some applications for water soluble films, rapid dissolution of the film is required. This is important in those applications where the film must quickly dissolve in order to expose the soluble contents of the package within a relatively short time.

There is therefore a real need in the marketplace to provide a packaging film in a way which conveniently provides the water soluble functionality at the time that the contained product is to be used.

The inventors have found that this can be achieved by providing an irradiated water soluble film. Using electron beam irradiation, a water soluble film's dissolution time can be tailored to some extent to meet the application requirements.

DEFINITIONS

"Water soluble" as used herein refers to polymeric materials which are soluble in water.

"Film" is used herein to mean a film, web, or other packaging material of one or more layers, made by e.g. extrusion, coextrusion, lamination (extrusion, thermal, or coreactant solvent-based or water-based adhesive system), coating, or other processes.

"PVOH" refers to polyvinyl alcohol.

"AAS" refers to acid/acrylate/styrene terpolymer.

SUMMARY OF THE INVENTION

The invention is in a first aspect a polymeric film comprising at least one irradiated water soluble layer.

The invention is in a second aspect a process for making a water soluble film comprising extruding a water soluble film, and irradiating the water soluble film.

The invention is in a third aspect a process for making a water soluble film comprising making a film comprising a water soluble portion and a water insoluble portion; irradiating the film; and removing the water insoluble portion from the film.

The invention is in a fourth aspect a package comprising a water soluble article; and a polymeric film comprising at least one irradiated water soluble layer, the film wrapped around the article.

BRIEF DESCRIPTION OF THE DRAWINGS

The invention may be further understood with reference to the drawings wherein.

DESCRIPTION OF THE PREFERRED EMBODIMENTS

Figure 1:
FIG. 1 is a schematic cross-section of a film of the present invention.

Referring to FIG. 1, a water soluble film 10 is shown, having a layer 12.

The film has been extruded by any conventional means, and then irradiated.

Figure 2:
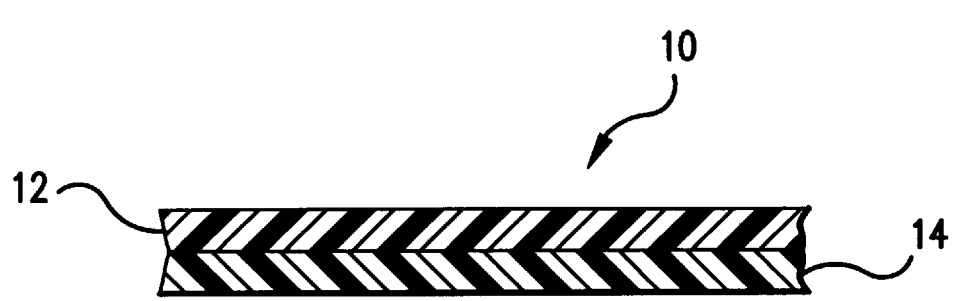
FIGS. 2 through 4 are schematic cross-sections of alternative embodiments of the invention.
Figure 3:
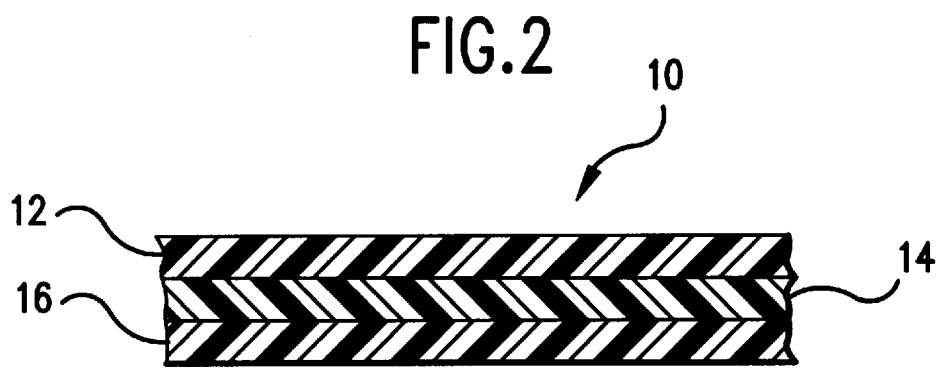

The film can be monolayer, or multilayer, in construction. One or more of the layers can comprise an irradiated water soluble material. FIG. 2 shows a multilayer film with layer 12 and layer 14. FIG. 3 shows a multilayer film with layers 12, 14, and 16.

Irradiation can be done by any conventional means. In the irradiation process, the film is subjected to an energetic radiation treatment, such as corona discharge, plasma, flame, ultraviolet, X-ray, gamma ray, beta ray, and high energy electron treatment. The irradiation of polymeric films is disclosed in U.S. Pat. No. 4,064,296, to Bornstein, et. al., which is hereby incorporated in its entirety, by reference thereto. Bornstein, et. al. disclose the use of ionizing radiation for crosslinking the polymer present in the film. Radiation dosages are referred to herein in terms of the radiation unit the radiation unit kiloGray (kGy). A suitable radiation dosage of high energy electrons is in the range of 1 to 250 kGy, more preferably about 44–139 kGy, and still more preferably, 80–120 kGy. Preferably, irradiation is carried out by an electron accelerator and the dosage level is determined by standard dosimetry methods. Other accelerators such as a Van de Graaff or resonating transformer may be used. The radiation is not limited to electrons from an accelerator since any ionizing radiation may be used. The most preferred amount of radiation is dependent upon the film and its end use.

Figure 4:
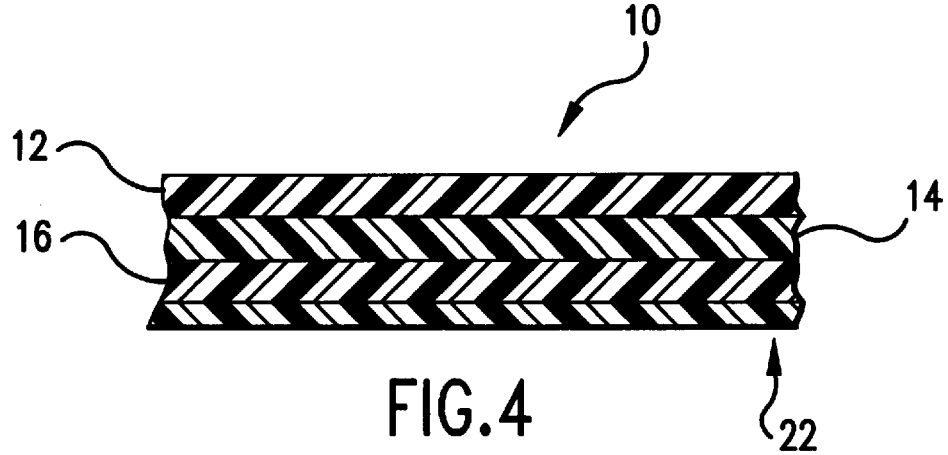

The irradiated water soluble film can be combined with another film, such as a water soluble or water insoluble film 22 as shown in FIG. 4. Film 22 can itself be monolayer or multilayer in construction. The film 10 and 22 can be produced by any conventional means, including coextrusion, lamination (extrusion, thermal, or coreactant solvent-based or water-based adhesive system), extrusion coating, corona bonding, or other suitable means. The interface between the films 10 and 22 can be peelable. A single coextruded film can be made, having a water soluble portion 10 and a water insoluble portion 22. This film can be irradiated to obtain the benefit of the invention.

Suitable materials for water soluble layer 12 include fully hydrolyzed polyvinyl alcohol; partially hydrolyzed polyvinyl alcohol; polyethers such as polyethylene oxide; acrylate based polymer such as acid/acrylate copolymer or terpolymer such as ethacrylic acid/ethyl acrylate copolymer and acid/acrylate/styrene terpolymer; styrene maleic anhydride copolymer (SMA); ethylene acrylic acid copolymer (EAA), ethylene methacrylic acid copolymer (EMAA), or metal salt neutralized ethylene methacrylic acid copolymer known as ionomer, in which the acid content of the EAA or EMAA is at least about 20 mole percent; polylactide (polylactic acid); polysaccharide such as cellulose, such as cellulose ether, such as hydroxy propyl cellulose, such as hydroxypropyl methyl cellulose; polyether polyamide copolymer such as polyether block amide copolymer; polyhydroxy butyric acid or polyhydroxy valeric acid; water soluble polyester or copolyester; polyethyloxazoline; water soluble polyurethane; partially metal salt neutralized acid/acrylate copolymer; a blend of acid/acrylate copolymer and ionomer; or blends of any of these materials.

Commercial polyvinyl alcohol is available from Air Products.

Polyether is available from Mitsubishi Plastics Company.

Another commercial example of polyether is available from Planet Polymer Technologies as Enviroplastic-H™.

A commercial example of polyethylene oxide is available from Union Carbide as Polyox™.

A commercial example of ethacrylic acid/ethyl acrylate copolymer is available from Belland as GBC 2580 and 2600.

Acid/acrylate/styrene terpolymer is available from Belland.

A commercial example of styrene maleic anhydride copolymer (SMA) is available from Monsanto as Scripset™.

Commercial ionomers are available from du Pont.

Polylactide is available from Ecochem and Cargill.

Hydroxy propyl cellulose is available from the Aqualon Division of Hercules as Klucel™.

Hydroxypropyl methyl cellulose is available from Dow Chemical as Methocel™.

Polyhydroxy butyric acid and polyhydroxy valeric acid are available from Imperial Chemical Industries as Biopol™.

A commercial example of polyethyloxazoline is available from Dow as PEOX 200™.

In the case of a multilayer water soluble film, any of layers 12 and 14, and any additional layers can likewise can be any of the above referenced materials.

Water insoluble layers can comprise any suitable material as long as it is substantially water insoluble, and can be peelably adhered to the water soluble substrate.

The water insoluble layer, if present, can comprise a polymer; metal foil, film, sheet, or coating; a metalized foil, film, or sheet; a paper, or paper coated with a polymeric coating such as a high density polyethylene coating; or inorganic coating such as a silicon coating.

Suitable materials for the water insoluble layer include high density polyethylene; low density polyethylene; ethylene alpha olefin copolymer such as linear low density polyethylene, very low density polyethylene, ultra low density polyethylene and metallocene catalyzed polymer; ethylene unsaturated ester copolymer such as ethylene vinyl acetate copolymer and ethylene alkyl acrylate copolymer; ethylene acid copolymer such as ethylene acrylic acid copolymer and ethylene methacrylic acid copolymer; propylene polymer and copolymer such as metallocene catalyzed propylene copolymer; vinylidene chloride polymer and copolymer; polyvinyl chloride; polyamide; polyalkylene carbonate; polystyrene; polyhydroxyaminoether; or blends of any of these materials.

Preferred materials are those which are not only water insoluble, but also act as moisture barriers. These materials which have a moisture vapor transmission rate (MVTR) of preferably less than 100, more preferably less than 75, most preferably less than 50, such as less than 25, less than 20, less than 15, less than 10, less than 5, and less than 1 gm/24 hours, 100 square inches (ASTM F 1249 for values at 20 grams or lower; ASTM E 96 for values above 20 grams) at 100% relative humidity.

Any of film 12 or 22 can have up to nine layers or more made up of materials such as those referenced above, in any suitable combination.

The film of the present invention may be made into packages such as pouches, bags, or other containers, by any known means, including thermoforming, lidstock, horizontal form-fill-seal, vertical form-fill-seal, vacuum skin packaging, or other means.

The invention may be further understood by reference to the examples identified below. Table 1 identifies the resins used in the examples.

TABLE 1

| MATERIAL | TRADENAME | SOURCE |
| --- | --- | --- |
| $PVOH_1$ | VINEX 2025 | AIR PRODUCTS |
| $PVOH_2$ | VINEX 2025 + antiblock ($SiO_2$) | AIR PRODUCTS |
| $PVOH_3$ | VINEX 2144 | AIR PRODUCTS |
| $AAS_1$ | G70AX-15LA | BELLAND |

Table 2 identifies the three film structures used in the examples, and their thicknesses. These films were cast extruded or (for Film A) coextruded, and then run through an electron beam irradiation vult.

TABLE 2

| FILM | STRUCTURE | THICKNESS (MICRONS) |
| --- | --- | --- |
| A | $PVOH_2/PVOH_1/AAS_1$ | 276 |
| B | $PVOH_1$ | 175 |
| C | $PVOH_3$ | 76.2 |

Table 3 shows the examples made as discussed above, along with the applied dosage ($D_1$), and in some cases absorbed dosage ($D_2$). Applied were values ($D_1$) are in milliamperes. Absorbed dosage values ($D_2$) were measured for examples 1 to 4, but calculated for examples 5 to 8. Absorbed dosages were measured by FTIR, using a polyethylene film as a standard. The high energy from the electron beam causes the formation of crosslinks or double bonds in the amorphous regions of the polythylene standard due to chain scission and reformation. As the electron beam intensity or flux is increased, more radiation energy is absorbed by the polyethylene standard, causing more crosslinks to be formed. The subsequent increase in crosslinks is then measured using an FTIR spectrometer by ratioing the dose band (transvinylene) at 966 $cm^{-1}$ to the thickness band at 2,017 $cm^{-1}$. Control Examples 13 to 15 were not irradiated.

TABLE 3

| EXAMPLE | FILM | $D_1$ (MA) | $D_2$ (kGy) |
|---|---|---|---|
| 1 | A | 1.1 | 24.6 |
| 2 | A | 3.0 | 63.7 |
| 3 | A | 5.0 | 118.0 |
| 4 | A | 10.0 | 262.0 |
| 5 | B | 1.1 | 24.4 |
| 6 | B | 3.0 | 63.9 |
| 7 | B | 5.0 | 118.3 |
| 8 | B | 10.0 | 262.4 |
| 9 | C | 1.1 | 24.4 |
| 10 | C | 3.0 | 63.9 |
| 11 | C | 5.0 | 118.3 |
| 12 | C | 10.0 | 262.4 |
| 13 | C | 0.0 | — |
| 14 | A | 0.0 | — |
| 15 | B | 0.0 | — |

Table 4 shows some of the films of Table 3, along with percent solubility measured at the indicated temperature, time, and solvent medium.

TABLE 4

| EXAMPLE | FILM | SOLVENT | TEMP. (° F.) | TIME (min.) | DISSOLVED (%) |
|---|---|---|---|---|---|
| 7 | B | $H_2O$ | 78 | 5.0 | 100.0 |
| 11 | C | $H_2O$ | 78 | 4.5 | 100.0 |
| 12 | C | $H_2O$ | 78 | 6.0 | 100.0 |
| 13 | C | $H_2O$ | 42 | 3.5 | 100.0 |
| 15 | B | $H_2O$ | 42 | 9.0 | 100.0 |
| 8 | B | $H_2O$ | 42 | 9.5 | 100.0 |
| 12 | C | $H_2O$ | 42 | 5.0 | 100.0 |
| 14 | A | 5% NaOH | 79 | 10.0 | 4.7 |
| 4 | A | 5% NaOH | 79 | 10.0 | 3.2 |
| 14 | A | 13pH NaOH | 160 | 60.0 | 40.4 |
| 4 | A | 13pH NaOH | 160 | 60.0 | 94.2 |
| 14* | A | 13pH NaOH | 160 | 60.0 | 85.2 |
| 4* | A | 13pH NaOH | 160 | 60.0 | 94.2 |
| 2 | A | 13pH NaOH | 160 | 60.0 | 93.2 |

*These samples were cut in very small pieces to evaluate effect of sample geometry on solubility. The remaining samples were cut and evaluated using large single pieces of film.
"5% NaOH" refers to a 5% caustic solution.

Additional samples were tested, as identified in Table 5. Control Example 16 was not irradiated.

TABLE 5

| EXAMPLE | FILM | $D_1$ (MA) | $D_2$ (kGy) |
|---|---|---|---|
| 16 | A | 0.0 | 0.0 |
| 17 | A | 3.0 | 62.8 |
| 18 | A | 3.0 | 63.6 |
| 19 | A | 10.0 | 232.0 |
| 20 | A | 10.0 | 235.4 |

Table 6 lists the films of Table 5, along with percent solubility measured at the indicated temperature, time, and solvent medium. Samples were cut into approximately 0.25 inch squares before running in 500 milliliters of 5% NaOH solution with pH of 13.

TABLE 6

| EXAMPLE | FILM | SOLVENT | TEMP. (° F.) | TIME (min.) | DISSOLVED (%) |
|---|---|---|---|---|---|
| 16a | A | 13pH NaOH | 160 | 30 | 98.4 |
| 16b | A | 13pH NaOH | 160 | 60 | 99.0 |
| 17[1] | A | 13pH NaOH | 160 | 30 | 100.0 |
| 18[1] | A | 13pH NaOH | 160 | 30 | 100.0 |
| 19[2] | A | 13pH NaOH | 160 | 30 | 100.0 |
| 20[2] | A | 13pH NaOH | 160 | 30 | 100.0 |

[1]Sample dissolved completely in 22 to 24 minutes.
[2]Sample dissolved completely in 10 minutes.

Films of the present invention preferably range in thickness from 0.2 to 20 mils and are more preferably between about 2 and 15 mils in thickness Optimal thicknesses will depend at least in part on the intended end-use, packaging format, and cost considerations. Films of the invention can be optionally biaxially or uniaxially oriented, by any suitable technique well known in the art, such as tenter frame or trapped bubble. The oriented film will be heat shrinkable, but can optionally be heat set or annealed to remove all or some of its heat shrinkability.

What is claimed is:

1. A polymeric film comprising at least one irradiated water soluble layer, wherein the film is irradiated at an absorbed dosage of between 1 and 250 kGy, and wherein the water soluble layer comprises a material selected from the group consisting of polyether, polysaccharide, polyether polyamide co-polymer, polyhydroxy butyric acid, polyhydroxy valeric acid, polyethyloxazoline, partially metal salt neutralized acid-acrylate copolymer, a blend of acid-acrylate copolymer and ionomer, and blends of any of these materials.

2. The film of claim 1 wherein the solubility rate of the layer is greater than the same layer in a non-irradiated condition.

3. The film of claim 1 wherein the percent solubility of the layer is greater than the same layer in a non-irradiated condition.

4. The film of claim 1, wherein the film is adhered to a second film.

5. The film of claim 4, wherein the second film comprises at least one water insoluble layer.

6. The film of claim 5 wherein the water insoluble layer comprises a material selected from the high density polyethylene, low density polyethylene, ethylene alpha olefin copolymer, ethylene unsaturated ester copolymer, ethylene acrylic acid copolymer, ethylene methacrylic acid copolymer, propylene polymer, propylene copolymer, vinylidene chloride polymer, vinylidene chloride copolymer, polyvinyl chloride, polyamide, polyalkylene carbonate, polystyrene, polyhydroxyaminoether, and blends of any of these materials.

7. A process for making a water soluble film comprising:
a) extruding a water soluble film, wherein the water soluble layer comprises a material selected from the group consisting of fully hydrolyzed polyvinyl alcohol, partially hydrolyzed polyvinyl alcohol, polyether, acrylate polymer, styrene maleic anhydride copolymer, ethylene acrylic or methacrylic acid copolymer with an acid content of at least 20 mole percent, polysaccharide, polyether polyamide copolymer, polyhydroxy butyric acid, polyhydroxy valeric acid, polyethyloxazoline, polyurethane, partially metal salt neutralized acid-acrylate copolymer, a blend of acid-acrylate copolymer and ionomer, and blends of any of these materials; and b) irradiating the water soluble film, wherein the film is irradiated at an absorbed dosage of between 1 and 250 kGy.

8. The process of claim 7 wherein the water soluble film is irradiated by electron beam radiation.

9. The process of claim 7 wherein the film is irradiated at an applied dosage of between 0.1 and 20 MA.

10. The process of claim 7 wherein the film is oriented.

11. The process of claim 7 wherein the film is heat shrinkable.

12. A process for making a water soluble film comprising:

a) making a film comprising a water soluble layer and a water insoluble layer, the water soluble layer comprising a material selected from the group consisting of polyether, ionomer, polysaccharide, polyether polyamide copolymer, polyhydroxy butyric acid, polyhydroxy valeric acid, polyethyloxazoline, partially metal salt neutralized acid-acrylate copolymer, a blend of acid-acrylate copolymer and ionomer, and blends of any of these materials;

b) irradiating the film, wherein the film is irradiated at an absorbed dosage of between 1 and 250 kGy; and c) removing the water insoluble layer from the film.

13. The process of claim 12 wherein the film is coextruded.

14. The process of claim 12 wherein the film is a laminate of the water soluble portion and the water insoluble portion.

15. The process of claim 12 wherein the film is oriented.

* * * * *